(12) United States Patent  
Ilincic et al.

(10) Patent No.: US 11,354,648 B2  
(45) Date of Patent: Jun. 7, 2022

(54) TRANSACTION CARD UTILIZING VOICE-ACTIVATED COMMANDS

(71) Applicant: Capital One Services, LLC, McLean, VA (US)

(72) Inventors: Rajko Ilincic, Annandale, VA (US); Sarah J. Cunningham, Arlington, VA (US); James Zarakas, Centreville, VA (US); William F. Carroll, Huntingtown, MD (US); George Bergeron, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 67 days.

(21) Appl. No.: 16/813,415

(22) Filed: Mar. 9, 2020

(65) Prior Publication Data

US 2021/0279715 A1    Sep. 9, 2021

(51) Int. Cl.  
*G06Q 20/34*    (2012.01)

(52) U.S. Cl.  
CPC .................. *G06Q 20/341* (2013.01)

(58) Field of Classification Search  
CPC .................................... G06Q 20/341  
USPC ............................................. 705/41  
See application file for complete search history.

(56) References Cited

U.S. PATENT DOCUMENTS

| | | | |
|---|---|---|---|
| 7,567,934 B2 | 7/2009 | Flitcroft et al. | |
| 2009/0070263 A1* | 3/2009 | Davis ................... | G06Q 20/322 705/44 |
| 2012/0145783 A1* | 6/2012 | Landau ............... | G06Q 20/4014 235/382 |
| 2013/0018792 A1* | 1/2013 | Casey ................ | G06Q 20/2295 705/44 |
| 2013/0290136 A1* | 10/2013 | Sheets ................ | G06Q 30/0609 705/26.35 |
| 2015/0046162 A1* | 2/2015 | Aley-Raz ................ | G10L 17/04 704/247 |
| 2015/0278820 A1* | 10/2015 | Meadows ............... | G10L 25/48 705/64 |
| 2016/0210451 A1* | 7/2016 | Hwang ............. | G06V 40/1365 |
| 2016/0267486 A1* | 9/2016 | Mitra ...................... | G07F 7/082 |

(Continued)

OTHER PUBLICATIONS

Robin Amfield, ATM Fraud and Security 101, Nov. 18, 2015, ATM Marketplace, White Papers, Networld Media Group DBA Network Alliance, LLC, pp. 1-32 (Year: 2015).*

*Primary Examiner* — Benjamin S Brindley  
(74) *Attorney, Agent, or Firm* — Harrity & Harrity, LLP

(57) ABSTRACT

A transaction card receives sound waves that represent a user command, where the user command identifies one or more transaction restrictions of the transaction card. The transaction card converts the sound waves to a digital signal and identifies, based on an analysis of the digital signal, user command data that identifies the user command. The transaction card sets, based on identifying the user command data, one or more transaction restriction values for the one or more transaction restrictions. The transaction card receives transaction metadata associated with a transaction and determines whether the transaction is compliant with the one or more transaction restrictions. The transaction card causes, based on determining whether the transaction is compliant with the one or more transaction restrictions, the transaction to be processed by a server device, or to be declined.

20 Claims, 9 Drawing Sheets

(56) References Cited

U.S. PATENT DOCUMENTS

| | | |
|---|---|---|
| 2016/0321663 A1 | 11/2016 | Batlle |
| 2017/0046608 A1* | 2/2017 | Narendra ......... G06K 19/07345 |
| 2017/0154328 A1* | 6/2017 | Zarakas ............... G06Q 20/204 |
| 2017/0193800 A1* | 7/2017 | Marra ..................... H04W 4/80 |
| 2018/0032997 A1* | 2/2018 | Gordon ............. G06Q 30/0269 |
| 2020/0111094 A1* | 4/2020 | Maheshwari .... G06Q 20/40145 |

\* cited by examiner

TRANSACTION CARD UTILIZING VOICE-ACTIVATED COMMANDS

BACKGROUND

A transaction card (e.g., a debit card, a credit card, and/or the like) may enable a card holder to pay a merchant for goods and/or services. For example, an individual may give the transaction card to a merchant to allow the merchant to use the transaction card to charge the individual for a good or a service.

SUMMARY

According to some implementations, a method may include receiving, by a transaction card, sound waves that represent a user command. The user command may identify one or more transaction restrictions of the transaction card. The method may include converting, by the transaction card, the sound waves to a digital signal. The method may include identifying, by the transaction card and based on an analysis of the digital signal, user command data that identifies the user command. The method may include setting, by the transaction card and based on identifying the user command data, one or more transaction restriction values for the one or more transaction restrictions. The method may include receiving, by the transaction card, transaction metadata associated with a transaction. The method may include determining, by the transaction card, whether the transaction is compliant with the one or more transaction restrictions. The method may include causing, by the transaction card and based on determining whether the transaction is compliant with the one or more transaction restrictions, the transaction to be processed by a server device or declined.

According to some implementations, a transaction card may include a secure memory, a set of sensors, and one or more processors configured to receive, from a motion sensor of the set of sensors, an indication that the transaction card has been moved in a particular pattern. The one or more processors may, based on receiving the indication that the transaction card has been moved in the particular pattern, power on a sound sensor of the set of sensors, and receive, from the sound sensor, sound waves that represent a user command that has been detected by the sound sensor. The user command may identify one or more transaction restrictions of the transaction card. The one or more processors may convert the sound waves to a digital signal. The one or more processors may identify, based on an analysis of the digital signal, user command data that identifies the user command. The one or more processors may set, based on identifying the user command data, one or more transaction restriction values for the one or more transaction restrictions in the secure memory. The one or more processors may receive transaction metadata associated with a transaction. The one or more processors may determine whether the transaction is compliant with the one or more transaction restrictions. The one or more processors may cause, based on determining whether the transaction is compliant with the one or more transaction restrictions, the transaction to be authorized or declined.

According to some implementations, a non-transitory computer-readable medium may store instructions that include one or more instructions that, when executed by one or more processors of a transaction card, cause the one or more processors to receive sound waves that represent a user command, wherein the user command identifies one or more transaction restrictions of the transaction card. The one or more instructions may cause the one or more processors to convert the sound waves to a compressed digital signal. The one or more instructions may cause the one or more processors to identify, based on an analysis of the compressed digital signal, user command data that identifies the user command. The one or more instructions may cause the one or more processors to set, based on identifying the user command data, one or more transaction restriction values for the one or more transaction restrictions. The one or more instructions may cause the one or more processors to receive transaction metadata associated with a transaction and determine whether the transaction is compliant with the one or more transaction restrictions. The one or more instructions may cause the one or more processors to cause, based on determining whether the transaction is compliant with the one or more transaction restrictions, the transaction to be: processed by a server device, or declined by the transaction card without assistance from the server device.

DETAILED DESCRIPTION

Figure 1A:
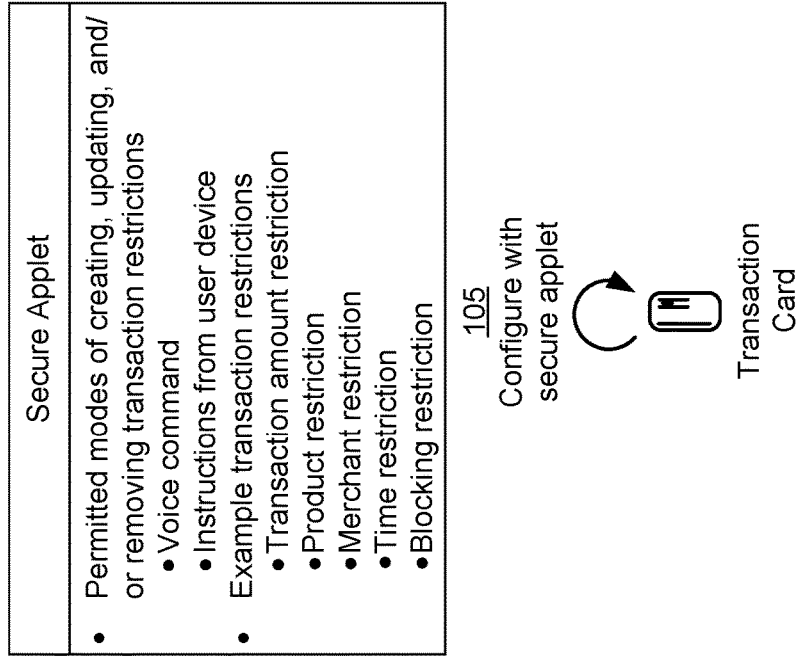
FIGS. 1A-1D are diagrams of one or more example implementations described herein.

The following detailed description of example implementations refers to the accompanying drawings. The same reference numbers in different drawings may identify the same or similar elements.

An individual, associated with an account, may have a transaction card that allows the individual to engage in transactions for products and/or services. The individual may be said to an authorized user of the transaction card. In some cases, the individual may hand the transaction card to another individual (e.g., a merchant, a child that is using the transaction card, etc.) who has been given authorization to use the transaction card for a limited purpose. For example, if the individual gives the transaction card to a merchant, the merchant may be permitted to use the transaction card to process a transaction for a good or a service. As another example, if the individual is a parent and gives the transaction card to a child, the child may be permitted to use the transaction card to purchase a good or a service.

However, the individual (i.e., the authorized user) may be exposed to higher than anticipated charges when the transaction card is provided to the other individual. For example, the merchant may overcharge the individual for a good or a service, the child may use the transaction card to purchase more than what was authorized by the parent, and/or the like. This wastes computing resources and network resources to identify, dispute, investigate, and/or correct the additional charge(s).

Some implementations described herein provide a transaction card to set, based on receiving a voice command from an individual, one or more transaction restrictions that allow the transaction card to determine whether to permit a transaction to be processed based on whether the transaction is compliant with the one or more transaction restrictions. For example, the transaction card may include a motion sensor (e.g., an accelerometer, etc.), and the individual (e.g., an authorized user) may activate a sound sensor of the transaction card (e.g., a microphone) by shaking the transaction card or by performing another configurable action. In this case, the individual may speak a user command which may cause sound waves to be captured by the transaction card (e.g., using the sound sensor). To provide a few examples, the individual might state "limit spending to $50.00," "limit spending to merchant A," "clear transaction restrictions," and/or the like.

Additionally, the transaction card may convert the sound waves to a digital signal and may analyze the digital signal to identify user command data that identifies the user command. In some cases, the transaction card may first convert the digital signal to a compressed digital signal and may identify the user command data based on an analysis of the compressed digital signal. In this case, the transaction card may set one or more transaction restriction values for the one or more transaction restrictions.

Furthermore, the individual may provide the transaction card to another individual who may use the transaction card to process a transaction for a good or a service. In this case, when the transaction card is used to process the transaction (e.g., by being placed into a transaction card reader), the transaction card may receive transaction metadata associated with the transaction. Moreover, the transaction card may determine whether the transaction is compliant with the one or more transaction restrictions by comparing the transaction metadata and the one or more transaction restriction values. In this case, the transaction card may cause the transaction to be processed (e.g., by a bank server) or declined based on whether the transaction is compliant with the one or more transaction restrictions.

By using the transaction card to set transaction restrictions, the transaction card improves security for the individual by preventing certain types of unauthorized transactions. Furthermore, by preventing certain types of unauthorized transactions at the transaction card (e.g., locally, without interaction with a bank server, etc.), the transaction card conserves processing resources of the bank server (e.g., by eliminating a need for the bank server to receive, process, and transmit data), conserves network resources of one or more devices that would otherwise be used to transmit data between the transaction card and the bank server, improves security by eliminating a need to send data via a network in situations when a transaction fails to comply with a transaction restriction (e.g., data sent via the network may be susceptible to being intercepted by unauthorized users), and/or the like. Additionally, the transaction card conserves computing resources and network resources that would otherwise be expended identifying, disputing, investigating, and/or correcting one or more additional charges that are made to an account of the individual.

FIGS. 1A-1D are diagrams of one or more example implementations 100 described herein. For example, example implementation(s) 100 may include a user device, a transaction card (e.g., that includes a motion sensor, a sound sensor, a digital signal processor, a microcontroller, a secure applet, and/or the like), and a transaction card reader. As shown in FIGS. 1A-1D, the transaction card may set one or more transaction restrictions and may cause a transaction for a good and/or service to be declined based on determining that the transaction does not comply with the one or more transaction restrictions.

As shown in FIG. 1A, and by reference number 105, the transaction card may be configured with a secure applet. For example, the transaction card may be configured with a secure applet that is able to enforce a set of transaction restrictions. The set of transaction restrictions may include a transaction restriction that limits an amount that is permitted to be charged for transactions, a transaction restriction that limits transactions to transactions involving a particular product, a transaction restriction that limits transactions to transactions involving a particular merchant, a transaction restriction that provides a time frame during which a transaction may be made, a transaction restriction that provides a time frame during which one or more other transaction restrictions are valid, a blocking restriction that prevents all (or some) transactions on the transaction card, and/or the like.

In some implementations, the secure applet may include one or more functions that may be used to create a new transaction restriction, remove a transaction restriction, and/or update an existing transaction restriction. For example, the secure applet may create a new transaction restriction, remove a transaction restriction, and/or update an existing transaction restriction, based on a user command (e.g., a voice command), based on receiving instructions from another device (e.g., a server device, a device of a registered user, such as the user device, etc.), and/or the like.

As a particular example, the user device may be configured with a mobile application for managing transaction restrictions of the transaction card and/or may have access to a web application for managing the transaction restrictions. In this example, the individual may interact with an interface of the mobile application or the web application to create a new transaction restriction, to remove a transaction restriction, and/or to update an existing transaction restriction.

In some implementations, the secure applet may include a secure memory or may have access to the secure memory. In this case, the secure memory may use a data structure to associate a set of transaction restriction values for the set of transaction restrictions (which may be configured to null values) and a set of command identifiers for commands that correspond to the set of transaction restrictions.

In this way, the transaction card is configured with a secure applet that may be used to enforce one or more of the set of transaction restrictions.

Figure 1B:
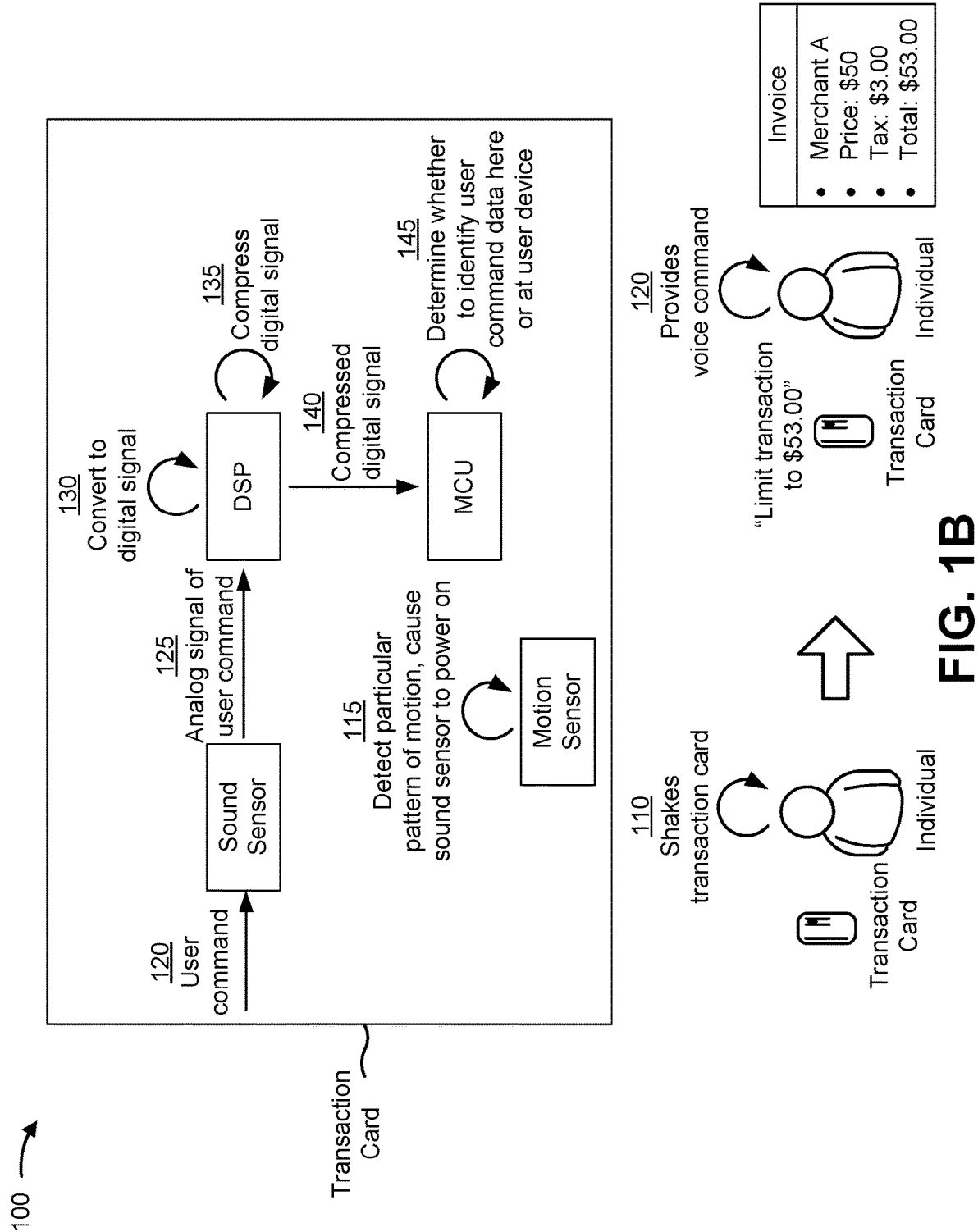

As shown in FIG. 1B, and by reference number 110, an individual, such as an authorized user of the transaction card, may shake the transaction card. In some implementations, the user may configure the motion that activates the sound sensor. For example, the user may configure a particular pattern of motion, a particular hand sequence, and/or the like, to activate the sound sensor.

As shown by reference number 115, the transaction card (e.g., using a motion sensor, such as an accelerometer) may detect a particular pattern of motion, and may perform an action that causes a sound sensor of the transaction card to power on. For example, the motion sensor of the transaction card may measure acceleration of the transaction card over time (e.g., while the transaction card is being shaken by the individual) and may detect a particular pattern of motion based on a set of acceleration values measured over time. The particular pattern of motion may be based on a change in acceleration over time, a change in a physical location of the transaction card over time, and/or the like.

In some implementations, the motion sensor of the transaction card may perform an action that causes the sound sensor to power on. For example, the motion sensor may provide instructions to power on the sound sensor to a processor of the transaction card (e.g., a microcontroller, etc.) and the processor may power on the sound sensor.

In some implementations, the sound sensor of the transaction card may be powered on based on another trigger. For example, the transaction card (e.g., the processor) may receive instructions to power on the sound sensor from another device, such as from the server device, the user device, another type of sensor (e.g., a biosensor, a biometric sensor, etc.), and/or the like.

As shown by reference number 120, the individual may provide a voice command by speaking in a vicinity of the transaction card. For example, the individual may provide a voice command (shown as "limit transaction to $53.00") and sound waves of the voice command may be captured by the transaction card (e.g., using the sound sensor).

In some implementations (not shown), the transaction card may perform a preliminary verification check. For example, the transaction card may determine whether the sound waves of the individual match a voice profile of an authorized user. The voice profile of the authorized user may be stored using a secure memory. In this way, the transaction card may verify that an authorized user is making the voice command before expending additional processing resources to implement one or more transaction restrictions.

As shown by reference number 125, the sound sensor may generate and provide an analog signal of the user command to a digital signal processor (DSP) of the transaction card. For example, the sound sensor may capture and convert sound waves to an analog signal. In this case, the sound sensor may provide the analog signal to the DSP for further processing.

As shown by reference number 130, the transaction card (e.g., using the DSP) may convert the analog signal to a digital signal. For example, the DSP may use an analog-to-digital converter or a similar type of converter to convert the analog signal to the digital signal. In this case, the DSP may have access to a byte register and may convert the analog signal to a set of byte arrays.

As shown by reference number 135, the transaction card (e.g., using the DSP) may compress the digital signal. For example, the DSP may compress the digital signal using a lossless compression technique, a discrete cosine transform (DCT) technique, a modified DCT (MDCT), and/or the like. In some cases, the DSP may compress the digital signal by reducing the set of byte arrays to one or more byte arrays.

As shown by reference number 140, the DSP may provide the compressed digital signal to the MCU of the transaction card. In some implementations, the DSP may provide the compressed digital signal to the user device (rather than to the MCU of the transaction card).

In some implementations, before continuing to process the digital signal, the transaction card (e.g., using the MCU) may determine whether the digital signal represents sounds waves of an authorized user. For example, the MCU may analyze a set of byte arrays that represent the digital signal, to verify that the sound waves are sound waves of an authorized user. In this case, the MCU may reference a data structure that associates the digital signal with particular command data and/or with particular transaction restriction values.

As shown by reference number 145, the MCU of the transaction card may determine whether to identify the user command data by processing the compressed digital signal or by offloading the processing to the user device. For example, the MCU may begin to process the compressed digital signal to determine whether the user command is identifiable, and, if after a threshold time period the MCU is unable to identify the user command data, the MCU may offload the processing to the user device, as further described below.

In this way, the transaction card is able to convert sound waves for a user command to a compressed digital signal that may be further processed (e.g., by the transaction card or by the user device) to identify the user command data.

Figure 1C:
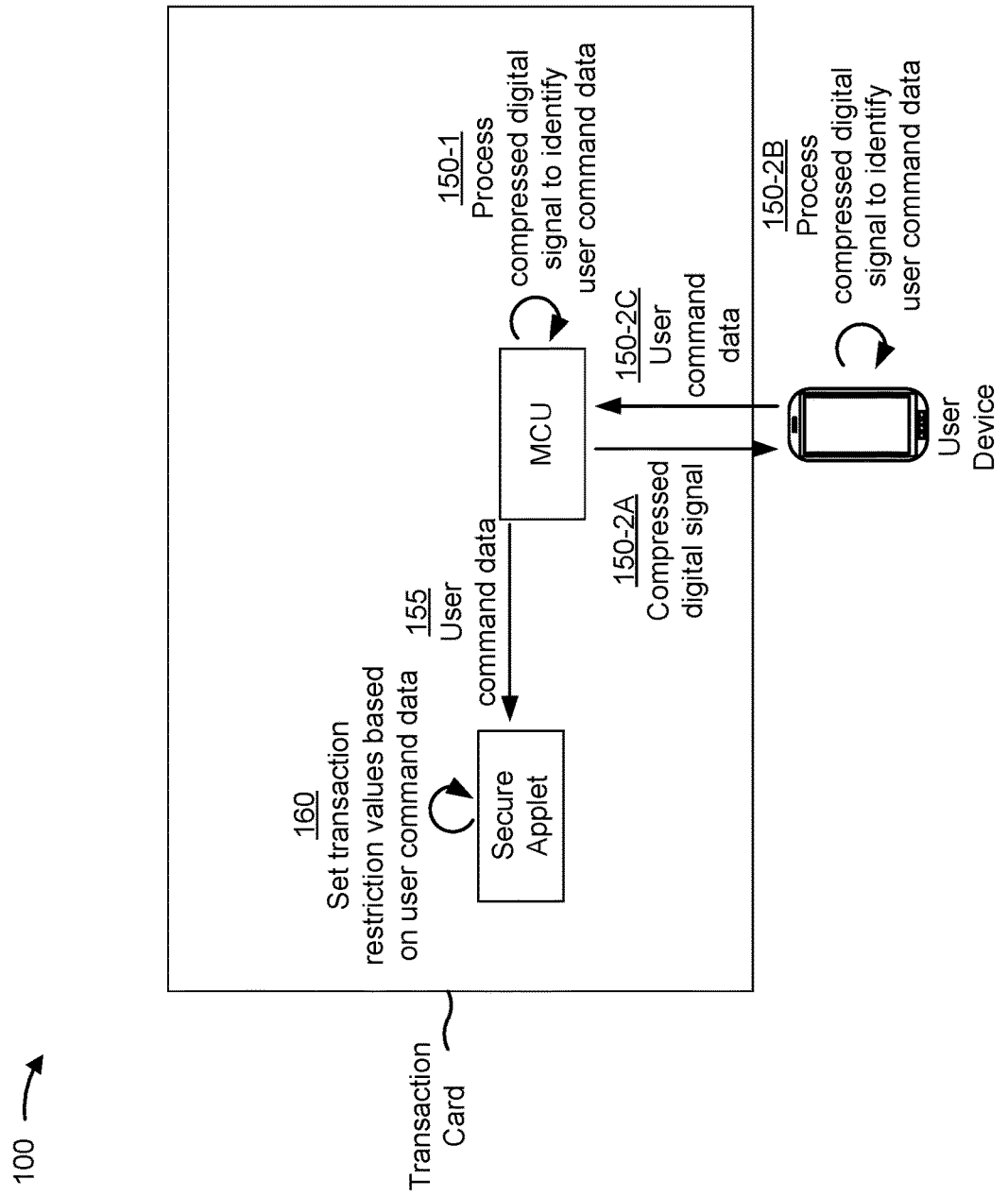

As shown in FIG. 1C, and by reference number 150-1, the transaction card (e.g., using the MCU) may process the compressed digital signal to identify the user command data. For example, the MCU may reference a data structure that associates the user command data for the user command and a corresponding one or more byte arrays that satisfies a threshold level of similarity with the one or more byte arrays that represent the compressed digital signal. The user command data for a user command may include a command identifier that identifies a command involving a particular transaction restriction, text data describing the command, and/or the like.

As shown by reference number 150-2A, the transaction card (e.g., using the MCU or the DSP) may provide the compressed digital signal to the user device. For example, the transaction card may provide the digital signal to the user device using Bluetooth, Bluetooth low energy (BLE), near field communication (NFC), and/or the like.

As shown by reference number 150-2B, the user device may process the compressed digital signal to identify the user command data. For example, the user device may identify the user command data by referencing a data structure in a manner described above. As another example, the user device may receive the digital signal (or the compressed digital signal) and may convert the digital signal (or the compressed digital signal) to an MP3 format or a similar type of format. This may allow the user device to reference one or more data structures that associate attributes of MP3 files with the user command data. In some cases, the user device may convert the MP3 file back to the digital signal (e.g., because the digital signal is in a format that may be processed by the MCU of the transaction card).

As shown by reference number 150-2C, the user device may provide the user command data to the MCU of the transaction card. For example, the user device may provide the command identifier or the one or more byte arrays to the MCU. As shown by reference number 155, the MCU may provide the user command data to the secure applet of the transaction card.

As shown by reference number 160, the transaction card (e.g., using the secure applet) may set one or more transaction restriction values based on the user command data. For example, the secure applet may process the user command data to identify one or more transaction restrictions values and may set the one or more transaction restriction values to reflect the user command. In some implementations, the one or more transaction restriction values may be set until the individual removes the one or more transaction restrictions. In some implementations, the one or more transaction restriction values may be set for a threshold time period.

In some implementations, the transaction card may set a transaction restriction value based on receiving the user command data from the MCU (as described above). In some implementations, the transaction card may set a transaction restriction value based on receiving instructions from the user or based on a similar type of trigger.

In this way, the transaction card is able to set one or more transaction restriction values that reflect the user command.

Figure 1D:
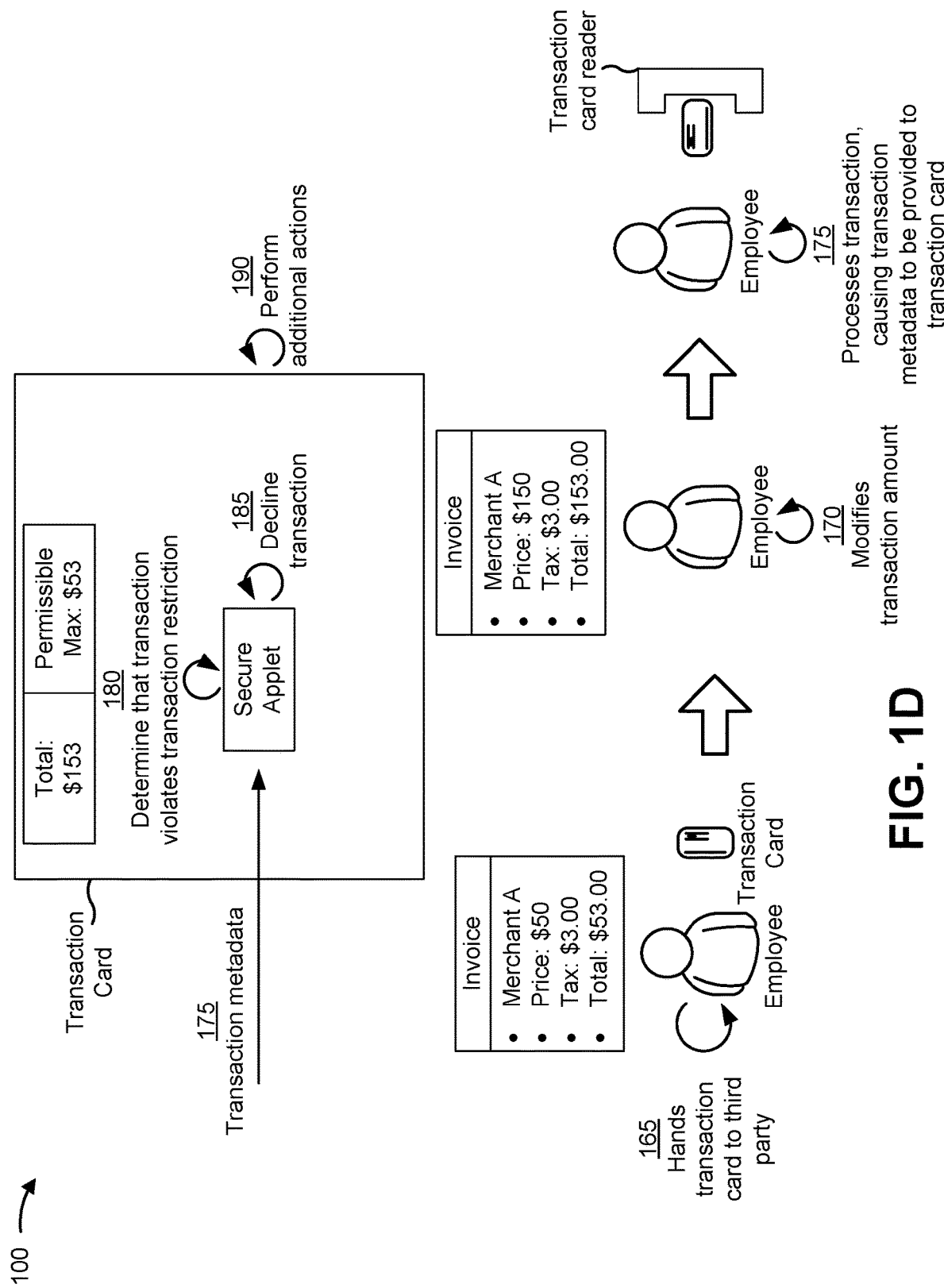

As shown in FIG. 1D, and by reference number 165, the individual may hand the transaction card to a third party (e.g., an employee of a store). For example, the individual may be engaging in a transaction to purchase a product or service and may hand the transaction card to an employee of a store to complete the transaction. As shown by reference number 170, the third party may modify a transaction amount (e.g., negligently, intentionally, etc.).

While the example shown involves the individual purchasing a product or service from an employee of a store, it is to be understood that this is provided by way of example. In practice, one or more techniques or methods described herein may be applied to any number of different scenarios. For example, a parent might set transaction restrictions and provide a child with the transaction card. In this example, the child might keep the transaction card for an extended time period (e.g., a day, a week, a month, a year, etc.) while the transaction restrictions remain active. As another example, the individual may set transaction restrictions that limit a spending amount at automated teller machines (ATMs). In this way, if an unauthorized user were to find the transaction card and obtain access to the PIN, the unauthorized user would only be able to withdraw up to the maximum indicated by the transaction restriction.

As shown by reference number 175, the third party may process the transaction (e.g., by placing the transaction card into a transaction card reader), which may cause transaction metadata to be provided to the transaction card (e.g., to the secure applet). The transaction metadata may include timestamp data, data identifying a transaction amount, a product identifier, a merchant identifier, and/or the like.

As shown by reference number 180, the transaction card (e.g., using the secure applet) may determine whether the transaction is compliant with the one or more transaction restrictions. For example, the transaction card may use the secure applet to compare the one or more transaction restriction values and values of the transaction metadata. If the transaction metadata values are in compliance with the one or more transaction restriction values, the secure applet may permit the transaction to be processed (e.g., by a bank server).

As shown by reference number 185, if the transaction metadata values are not in compliance with the one or more transaction restriction values, the secure applet may decline the transaction. For example, the secure applet may have permission to decline the transaction such that a bank server that performs authorization and/or authentication would not receive an authorization or authentication request. This conserves processing resources of the bank server by eliminating a need for the bank server to receive, process, and transmit data.

As an example, a transaction restriction value of $53 may serve as an upper bound and maximum transaction amount. In this example, if the transaction metadata includes a value indicating that the transaction total is $153, then the transaction metadata value does not comply with the transaction restriction value and the transaction card would decline the transaction.

As another example, combinations of transaction restrictions may be applied. In this example, assume a first transaction restriction includes a $53 maximum transaction amount, a second transaction restriction indicates that a next transaction must made at merchant A, and a third transaction restriction indicates that a next transaction must be for product B. In this example, the transaction card would decline the transaction unless the transaction involved purchasing product B, at merchant A, in a situation where product B cost no more than $53.

As shown by reference number 190, the transaction card (e.g., using the MCU or another component) may perform one or more additional actions. For example, the transaction card may provide, to the user device or to an electronic account associated with a primary authorized user, an indication of whether the transaction is in compliance with the one or more transaction restrictions. Additionally, or alternatively, if the one or more transaction restrictions are set for a particular time period, the transaction card may use a light-emitting diode (LED) to notify the individual when the particular time period has expired.

In some implementations, the transaction card may have one or more additional features not described elsewhere herein. For example, the transaction card may be configured with a transaction restriction that could indicate a threshold number of unauthorized transaction before locking the transaction card. Additionally, or alternatively, and provided as another example, the transaction card may be configured to notify an authorized user of a transaction only if the transaction was declined. In this case, the transaction card may provide the user with a timestamp of the attempt, a transaction terminal involved in the attempt, a product associated with the transaction, a merchant associated with the transaction, an employee identifier of an employee associated with the transaction, and/or the like. In this way, the transaction card conserves processing resources relative to notify the authorized user of all transactions.

Additionally, or alternatively, and provided as another example, the transaction card may be configured with a special lockdown sequence. For example, the user may be able to shake the transaction card in a special motion or pattern to cause the transaction card to automatically lock and decline all subsequent transactions (e.g., until unlocked by the authorized user). Additionally, or alternatively, and provided as another example, the transaction card may be locked remotely. For example, if an employee of a restaurant were to take the transaction card without authorization from the individual, the individual could access a website, a mobile application, and/or the like, to lock the transaction card remotely.

By using the transaction card to set the one or more transaction restrictions, the transaction card improves security for the individual by preventing certain types of unauthorized transactions. Furthermore, by preventing certain types of unauthorized transactions at the transaction card (e.g., locally, without interaction with a bank server, etc.), the transaction card conserves processing resources of the bank server (e.g., by eliminating a need for the bank server to receive, process, and transmit data), conserves network resources of one or more devices that would otherwise be used to transmit data between the transaction card and the bank server, improves security by eliminating a need to send data via a network in situations when a transaction fails to comply with a transaction restriction (e.g., data sent via the network may be susceptible to being intercepted by unauthorized users), and/or the like.

As indicated above, FIGS. 1A-1D are provided merely as examples. Other examples may differ from what was described with regard to FIGS. 1A-1D. For example, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple and/or distributed devices. Additionally, or alternatively, a set of devices (e.g., one or more devices) of example implementation(s) 100 may perform one or more functions described as being performed by another set of devices of example implementation(s) 100.

Figure 2:
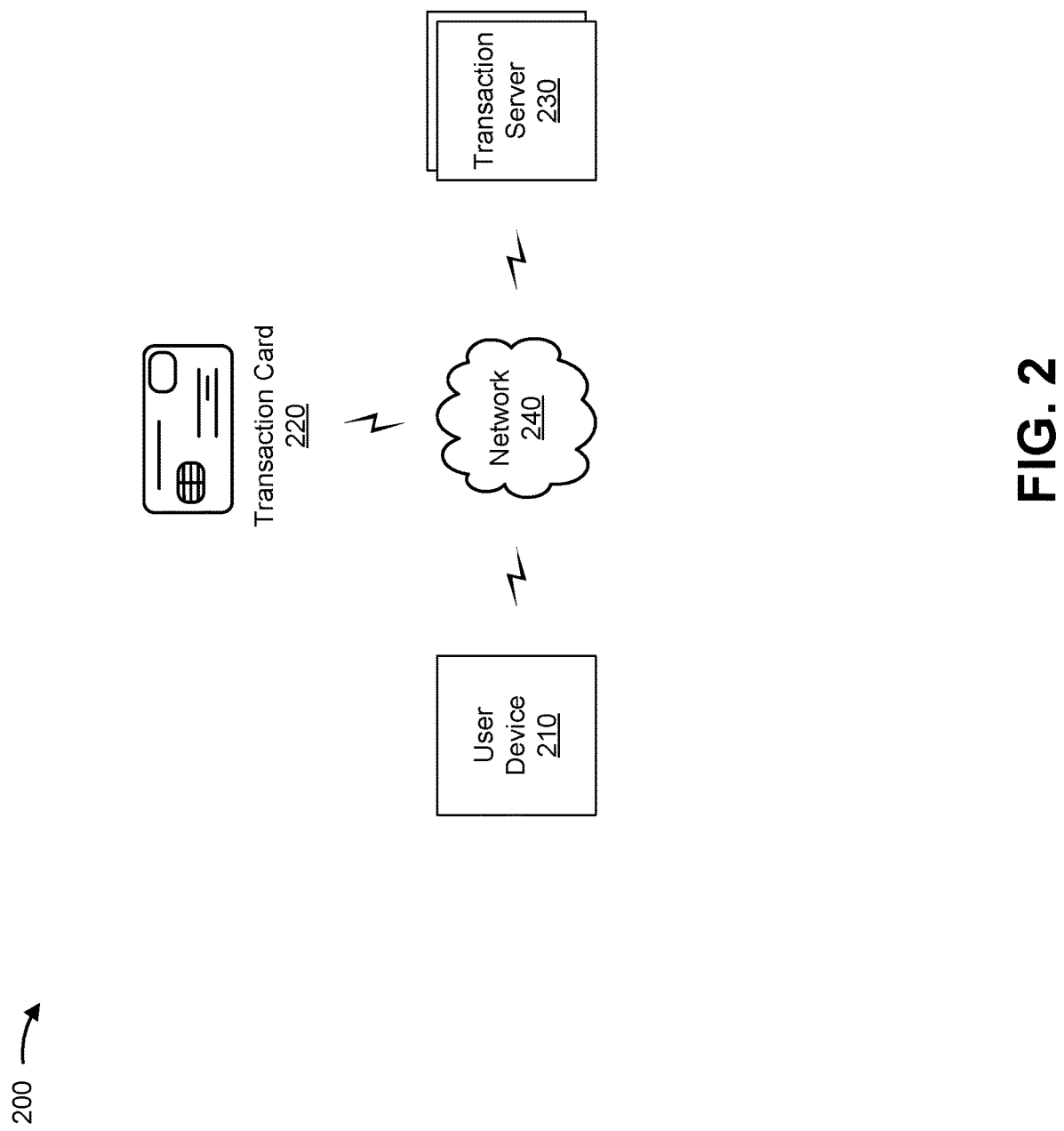
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a transaction card 220, a transaction server 230, and/or a network 240. Devices of environment 200 may interconnect via wired connections, wireless connections, or a combination of wired and wireless connections.

User device 210 includes one or more devices capable of receiving, generating, storing, processing, and/or providing information associated with a transaction. For example, user device 210 may include a mobile phone (e.g., a smart phone, a radiotelephone, etc.), a wearable communication device (e.g., a smart wristwatch, a pair of smart eyeglasses, etc.), an internet of things (IoT) device, a computer (e.g., a desktop computer, a laptop computer, a tablet computer, a handheld computer, a server device, etc.), or a similar type of device. In some implementations, user device 210 may provide a transaction restriction configuration to transaction card 220. For example, user device 210 may provide the transaction restriction configuration to transaction card 220 via Bluetooth, Bluetooth Low Energy (BLE), near-field communication (NFC), an application programming interface (API), and/or a similar type of communication interface.

In some implementations, user device 210 may receive, from transaction card 220, a digital signal or a compressed digital signal associated with a user command. In some implementations, user device 210 may analyze the digital signal or the compressed digital signal to identify the user command and may provide data identifying the user command (e.g., text data, etc.) to transaction card 220.

Transaction card 220 includes a transaction card with a set of sensors, a set of processors, and/or a set of applets. Transaction card 220 is capable of storing and/or communicating data for a transaction (e.g., a point of sale (PoS) transaction and/or an automated teller machine (ATM) transaction) with a transaction terminal. For example, transaction card 220 may store or communicate data including account information (e.g., an account identifier, a cardholder identifier, etc.), expiration information of transaction card 220, banking information, transaction information (e.g., a payment token, transaction metadata, etc.), and/or the like. As an example, to store or communicate the data, transaction card 220 may include a magnetic strip and/or an integrated circuit (IC) chip (e.g., a EUROPAY®, MASTERCARD®, VISA® (EMV) chip, or the like). In some implementations, transaction card 220 may communicate with a transaction terminal to complete a transaction (e.g., based on being moved within communicative proximity of the transaction terminal).

In some implementations, transaction card 220 may include an antenna to communicate data associated with transaction card 220. The antenna may be a passive radio frequency (RF) antenna, an active RF antenna, and/or a battery-assisted RF antenna. In some implementations, transaction card 220 may be a smart transaction card, may be capable of communicating wirelessly (e.g., via Bluetooth, Bluetooth Low Energy (BLE), near-field communication (NFC), and/or the like) with another device (e.g., user device 210, transaction server 230, etc.), and/or the like.

In some implementations, transaction card 220 may store a transaction restriction configuration and/or one or more transaction restriction values (e.g., using a data structure). In some implementations, transaction card 220 may be configured with an applet, such as a secure applet, that is able to support one or more functions used to create, modify, and/or implement the transaction restriction configuration and/or the one or more transaction restriction values.

In some implementations, transaction card 220 may include a sound sensor, such as a microphone or a similar type of device. In some implementations, transaction card 220 may include a sensor that is used to detect an event that requires powering on the sound sensor. For example, transaction card 220 may include a motion sensor (e.g., an accelerometer, passive infrared (PIR), and/or the like) that is able to detect a particular pattern of motion (e.g., a pattern of acceleration or motion created when a user moves transaction card 220 in a particular pattern, shakes transaction card 220 up and down or side to side, etc.). In some implementations, transaction card 220 may include one or more other types of sensors that may detect the event that requires powering on the sound sensor, such as a proximity sensor, a biosensor (e.g., to detect chemicals caused by human touch), a biometrics sensor (e.g., to determine whether physical contact with transaction card 220 is a primary authorized user), or a similar type of sensor. In some implementations, the motion sensor, the proximity sensor, and/or the like, may cause the sound sensor of transaction card 220 to power on (e.g., by sending a signal to a processor of transaction card 220, by sending a signal to the sound sensor, and/or the like).

In some implementations, transaction card 220 may include a set of processors. For example, transaction card 220 may include a digital signal processor (DSP), a microcontroller, and/or the like, which may be used to perform one or more tasks or functions described herein.

Transaction server 230 includes one or more devices capable of authenticating and/or authorizing a transaction involving transaction card 220. For example, transaction server 230 may include a server device or a group of server device. In some implementations, transaction server 230 may store and/or provide security access information that may or may not allow access through an access point (e.g., a gate, a door, and/or the like) of a secure location (e.g., a room, a building, an geographical area, a transportation terminal, and/or the like) based on information (e.g., account information, a key, an identifier, credentials, and/or the like) associated with transaction card 220 and/or provided by a transaction terminal. In some implementations, transaction server 230 may perform one or more actions to authenticate and/or authorize a transaction involving transaction card 220 based on transaction card 220 determining that transaction metadata associated with the transaction is compliant with one or more transaction restriction values.

Network 240 includes one or more wired and/or wireless networks. For example, network 240 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
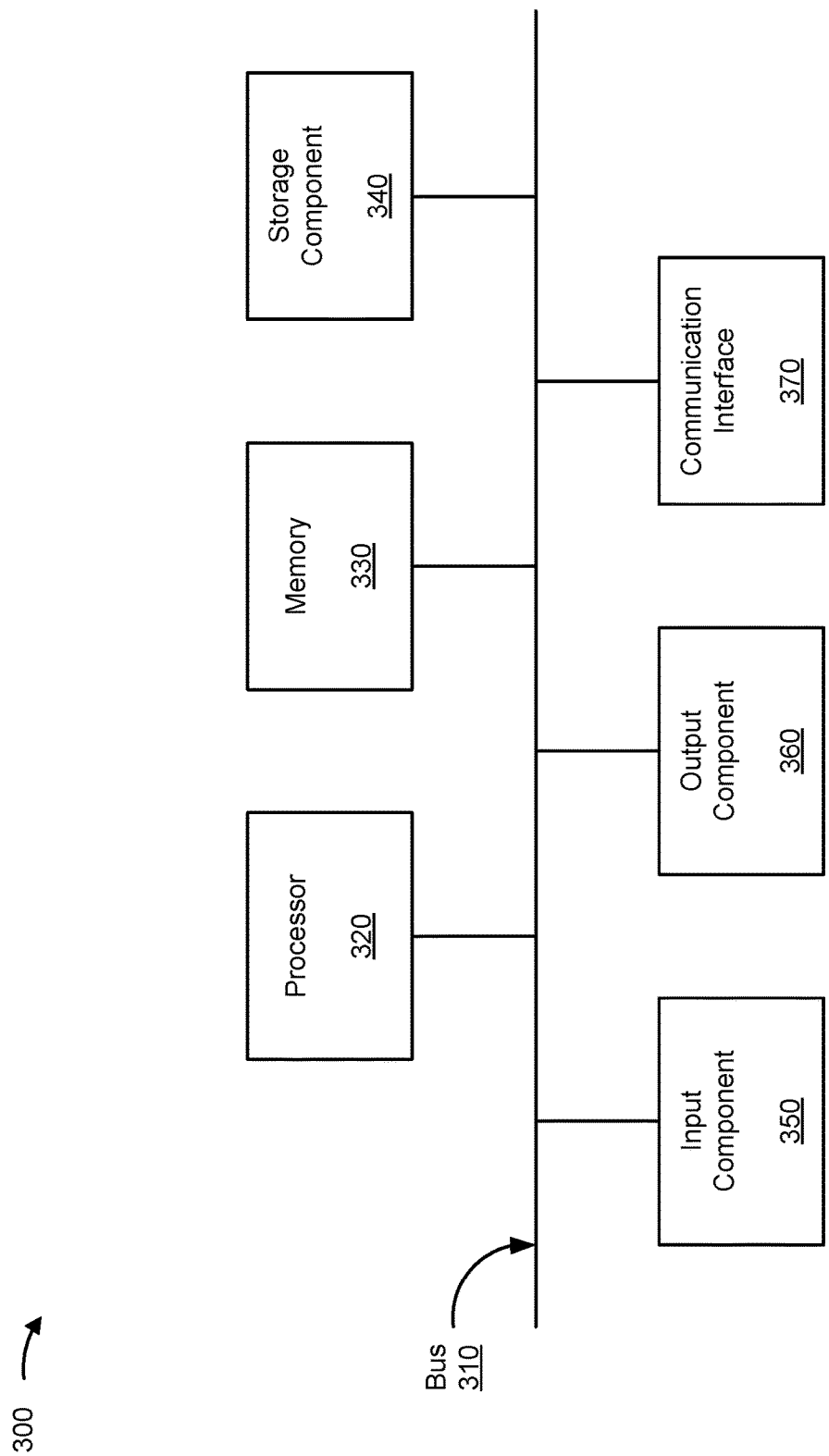
FIG. 3 is a diagram of example components of one or more devices of FIG. 2.

FIG. 3 is a diagram of example components of a device 300. Device 300 may correspond to user device 210, transaction card 220, and/or transaction server 230. In some implementations, user device 210, transaction card 220, and/or transaction server 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

In some implementations, memory 330 may be a secure memory that is secured using one or more forms of encryption, such as secure memory encryption (SME), transparent SME (TSME), secure encrypted virtualization (SEV), and/or a similar type of encryption. For example, memory 330 may be secured using one or more forms of encryption that are enabled during a bootup procedure associated with processor 320 and/or that are enabled based on another type of trigger. In some implementations, memory 330 may be part of, used by, and/or accessible to, a secure applet.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
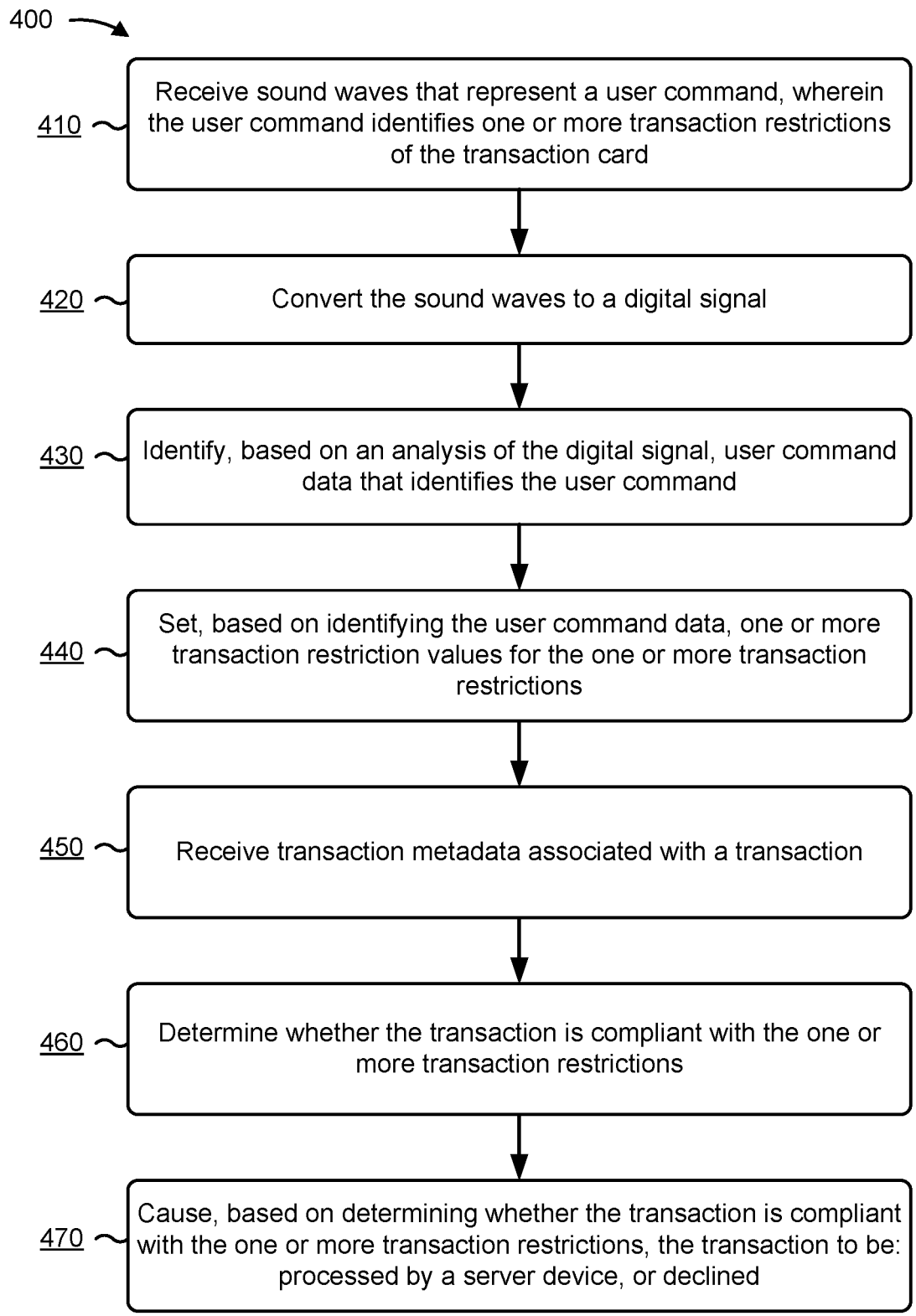
FIGS. 4-6 are flow charts of an example process for activating, based on receiving a user command, one or more transaction restrictions of a transaction card and causing a transaction to be processed or declined based on whether the transaction is compliant with the one or more transaction restrictions.

FIG. 4 is a flow chart of an example process 400 for activating, based on receiving a user command, one or more transaction restrictions of a transaction card and causing a transaction to be processed or declined based on whether transaction is compliant with the one or more transaction restrictions. In some implementations, one or more process blocks of FIG. 4 may be performed by a transaction card (e.g., transaction card 220). In some implementations, one or more process blocks of FIG. 4 may be performed by another device or a group of devices separate from or including the transaction card, such as a user device (e.g., user device 210), a transaction server (e.g., transaction server 230), and/or the like.

As shown in FIG. 4, process 400 may include receiving sound waves that represent a user command, wherein the user command identifies one or more transaction restrictions of the transaction card (block 410). For example, the transaction card (e.g., using processor 320, memory 330, storage component 340, input component 350, communication interface 370, and/or the like) may receive sound waves that represent a user command, as described above. In some implementations, the user command may identify one or more transaction restrictions of the transaction card.

As further shown in FIG. 4, process 400 may include converting the sound waves to a digital signal (block 420).

For example, the transaction card (e.g., using processor 320, memory 330, storage component 340, and/or the like) may convert the sound waves to a digital signal, as described above.

As further shown in FIG. 4, process 400 may include identifying, based on an analysis of the digital signal, user command data that identifies the user command (block 430). For example, the transaction card (e.g., using processor 320, memory 330, storage component 340, and/or the like) may identify, based on an analysis of the digital signal, user command data that identifies the user command, as described above.

As further shown in FIG. 4, process 400 may include setting, based on identifying the user command data, one or more transaction restriction values for the one or more transaction restrictions (block 440). For example, the transaction card (e.g., using processor 320, memory 330, storage component 340, and/or the like) may set, based on identifying the user command data, one or more transaction restriction values for the one or more transaction restrictions, as described above.

As further shown in FIG. 4, process 400 may include receiving, by the transaction card, transaction metadata associated with a transaction (block 450). For example, the transaction card (e.g., using processor 320, memory 330, storage component 340, input component 350, communication interface 370, and/or the like) may receive, by the transaction card, transaction metadata associated with a transaction, as described above.

As further shown in FIG. 4, process 400 may include determining whether the transaction is compliant with the one or more transaction restrictions (block 460). For example, the transaction card (e.g., using processor 320, memory 330, storage component 340, and/or the like) may determine whether the transaction is compliant with the one or more transaction restrictions, as described above.

As further shown in FIG. 4, process 400 may include causing, based on determining whether the transaction is compliant with the one or more transaction restrictions, the transaction to be: processed by a server device, or declined (block 470). For example, the transaction card (e.g., using processor 320, memory 330, storage component 340, output component 360, communication interface 370, and/or the like) may cause, based on determining whether the transaction is compliant with the one or more transaction restrictions, the transaction to be processed by a server device (e.g., transaction server 230), or to be declined, as described above.

Process 400 may include additional implementations, such as any single implementation or any combination of implementations described below and/or in connection with one or more other processes described elsewhere herein.

In some implementations, when causing the transaction to be processed by the server device or declined, the transaction card may cause the transaction to be declined based on determining that the transaction does not comply with the one or more transaction restrictions, where the transaction card declines the transaction without assistance from the server device. In some implementations, the transaction card may detect, before receiving the sound waves, that the transaction card has been moved in a particular pattern and may power on a sound sensor of the transaction card based on detecting that the transaction card has been moved in the particular pattern.

In some implementations, the transaction card may convert the digital signal to a compressed digital signal, where the compressed digital signal is represented by a set of byte arrays. In some implementations, when identifying the user command, the transaction card may identify the user command by referencing a data structure that associates a command identifier for the user command and a corresponding set of byte arrays that satisfy a threshold level of similarity with the set of byte arrays that represent the compressed digital signal.

In some implementations, the transaction card may convert the digital signal to a compressed digital signal. In some implementations, when identifying the user command data that identifies the user command, the transaction card may provide the compressed digital signal to a device (e.g., user device 210) to cause the device to perform one or more actions to identify the user command data and may receive the user command data from the device.

In some implementations, the one or more transaction restrictions may include a first transaction restriction that limits an amount that is permitted to be charged for transactions, a second transaction restriction that limits transactions to transactions involving a particular product, a third transaction restriction that limits transactions to transactions involving a particular merchant, and/or a fourth transaction restriction that provides a time frame during which one or more other transaction restrictions are valid.

In some implementations, when determining whether the transaction is compliant, the transaction card may compare the one or more transaction restriction values and the transaction metadata, where the transaction metadata includes timestamp data, data identifying a transaction amount, a product identifier, and/or a merchant identifier, and may determine whether the transaction is compliant with the one or more transaction restrictions based on comparing the one or more transaction restriction values and the transaction metadata.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
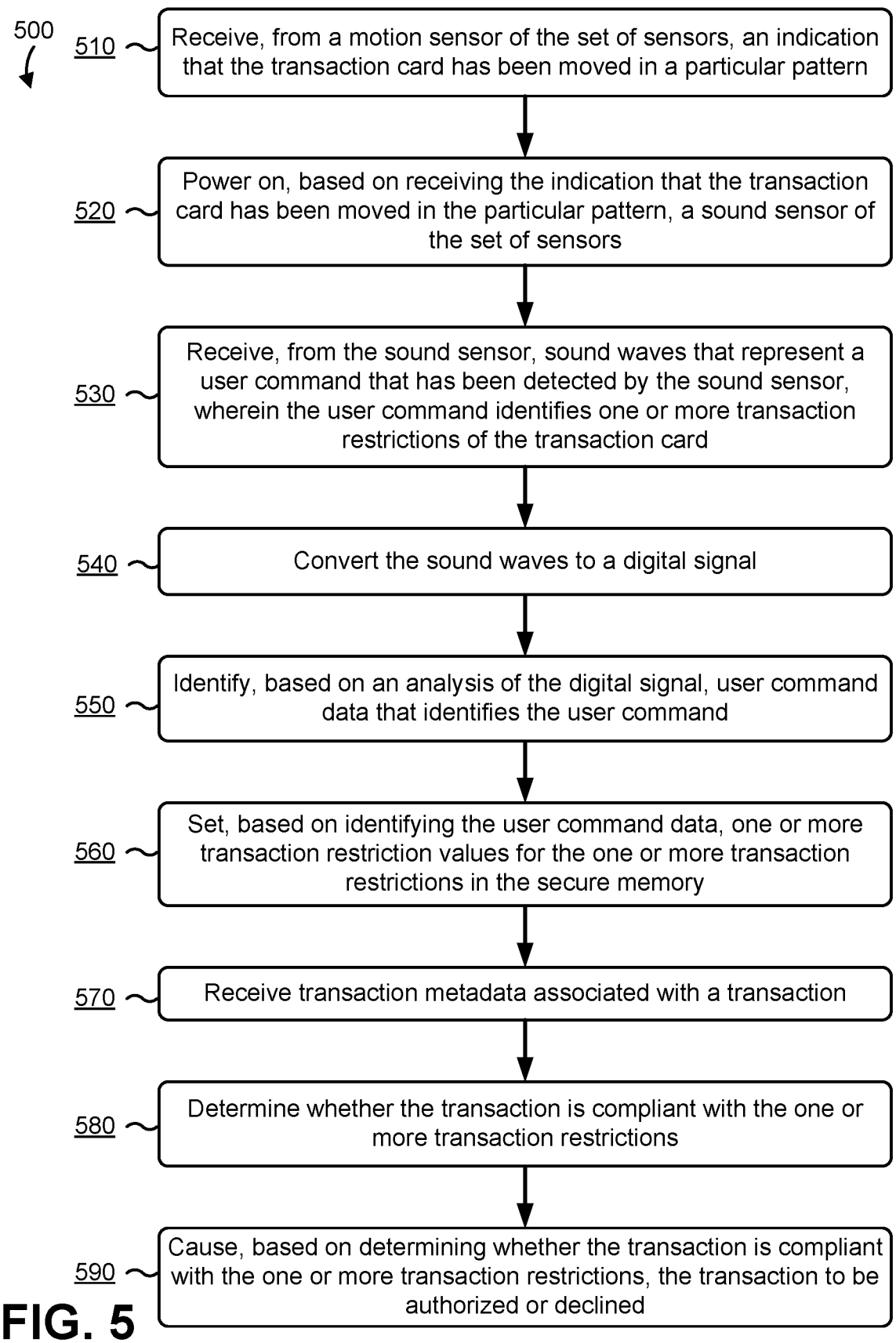

FIG. 5 is a flow chart of an example process 500 for activating, based on receiving a user command, one or more transaction restrictions of a transaction card and causing a transaction to be processed or declined based on whether transaction is compliant with the one or more transaction restrictions. In some implementations, one or more process blocks of FIG. 5 may be performed by a transaction card (e.g., transaction card 220). In some implementations, one or more process blocks of FIG. 5 may be performed by another device or a group of devices separate from or including the transaction card, such as a user device (e.g., user device 210), a transaction server (e.g., transaction server 230), and/or the like.

As shown in FIG. 5, process 500 may include receiving, from a motion sensor of the set of sensors, an indication that the transaction card has been moved in a particular pattern (block 510). For example, the transaction card (e.g., using processor 320, memory 330, storage component 340, input component 350, communication interface 370, and/or the like) may receive, from a motion sensor of the set of sensors, an indication that the transaction card has been moved in a particular pattern, as described above.

As further shown in FIG. 5, process 500 may include powering on, based on receiving the indication that the transaction card has been moved in the particular pattern, a sound sensor of the set of sensors (block 520). For example, the transaction card (e.g., using processor 320, memory 330, storage component 340, input component 350, communication interface 370, and/or the like) may power on, based on receiving the indication that the transaction card has been moved in the particular pattern, a sound sensor of the set of sensors, as described above.

As further shown in FIG. 5, process 500 may include receiving, from the sound sensor, sound waves that represent a user command that has been detected by the sound sensor, wherein the user command identifies one or more transaction restrictions of the transaction card (block 530). For example, the transaction card (e.g., using processor 320, memory 330, storage component 340, input component 350, communication interface 370, and/or the like) may receive, from the sound sensor, sound waves that represent a user command that has been detected by the sound sensor, as described above. In some implementations, the user command may identify one or more transaction restrictions of the transaction card.

As further shown in FIG. 5, process 500 may include converting the sound waves to a digital signal (block 540). For example, the transaction card (e.g., using processor 320, memory 330, storage component 340, and/or the like) may convert the sound waves to a digital signal, as described above.

As further shown in FIG. 5, process 500 may include identifying, based on an analysis of the digital signal, user command data that identifies the user command (block 550). For example, the transaction card (e.g., using processor 320, memory 330, storage component 340, and/or the like) may identify, based on an analysis of the digital signal, user command data that identifies the user command, as described above.

As further shown in FIG. 5, process 500 may include setting, based on identifying the user command data, one or more transaction restriction values for the one or more transaction restrictions in the secure memory (block 560). For example, the transaction card (e.g., using processor 320, memory 330, storage component 340, and/or the like) may set, based on identifying the user command data, one or more transaction restriction values for the one or more transaction restrictions in the secure memory, as described above.

As further shown in FIG. 5, process 500 may include receiving transaction metadata associated with a transaction (block 570). For example, the transaction card (e.g., using processor 320, memory 330, storage component 340, input component 350, communication interface 370, and/or the like) may receive transaction metadata associated with a transaction, as described above.

As further shown in FIG. 5, process 500 may include determining whether the transaction is compliant with the one or more transaction restrictions (block 580). For example, the transaction card (e.g., using processor 320, memory 330, storage component 340, and/or the like) may determine whether the transaction is compliant with the one or more transaction restrictions, as described above.

As further shown in FIG. 5, process 500 may include causing, based on determining whether the transaction is compliant with the one or more transaction restrictions, the transaction to be authorized or declined (block 590). For example, the transaction card (e.g., using processor 320, memory 330, storage component 340, output component 360, communication interface 370, and/or the like) may cause, based on determining whether the transaction is compliant with the one or more transaction restrictions, the transaction to be authorized or declined, as described above.

Process 500 may include additional implementations, such as any single implementation or any combination of implementations described below and/or in connection with one or more other processes described elsewhere herein.

In some implementations, when causing the transaction to be authorized or declined, the transaction card may cause, based on determining that the transaction is not compliant with the one or more transaction restrictions, the transaction to be declined without assistance from an external device (e.g., transaction server 230). In some implementations, the transaction card may convert the digital signal to a compressed digital signal, may determine whether the user command is made by an authorized user by analyzing the compressed digital signal, and, when identifying the user command data, the transaction card may identify the user command data based on determining that the user command is made by the authorized user.

In some implementations, the one or more transaction restrictions may include a first transaction restriction that limits an amount that is permitted to be charged for transactions, a second transaction restriction that limits transactions to transactions involving a particular product, a third transaction restriction that limits transactions to transactions involving a particular merchant, and/or a fourth transaction restriction that provides a time frame during which one or more other transaction restrictions are valid.

In some implementations, the transaction card may convert the digital signal to a compressed digital signal. In some implementations, when identifying the user command data that identifies the user command, the transaction card may reference a data structure that associates the user command data and a corresponding compressed digital signal that satisfies a threshold level of similarity with the compressed digital signal.

In some implementations, the transaction card may convert the digital signal to a compressed digital signal, and, when identifying the user command data that identifies the user command, the transaction card may compare the compressed digital signal and a set of compressed digital signals that are associated with a set of command identifiers, may fail to identify the user command data based on comparing the compressed digital signal and the set of compressed digital signals, may provide the compressed digital signal to a device (e.g., user device 210) to cause the device to perform one or more actions to identify the user command data, and may receive the user command data from the device.

In some implementations, the transaction card may determine, after setting the one or more transaction restriction values, that a time period has expired, and may reset the one or more transaction restriction values based on determining that the time period has expired.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
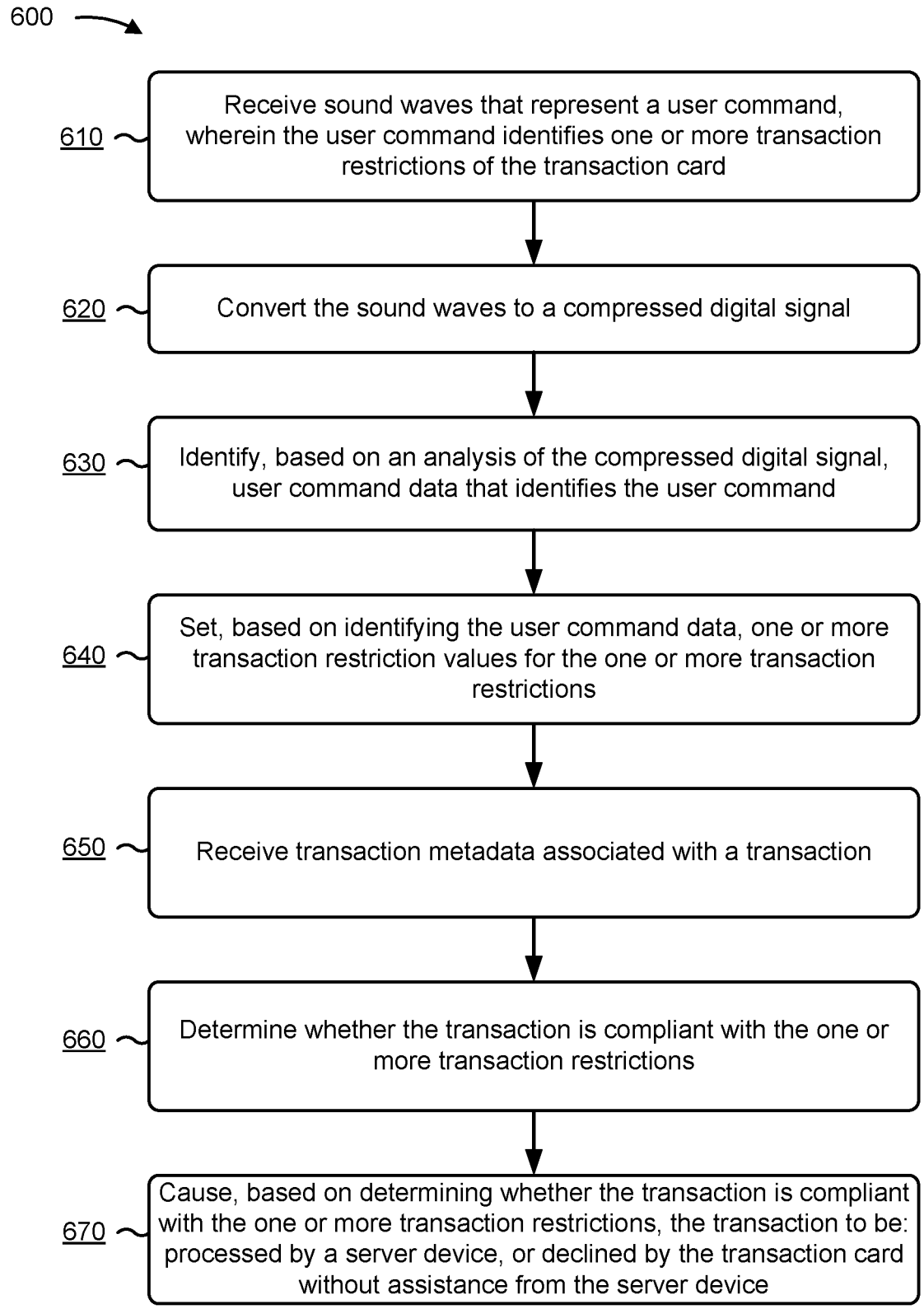

FIG. 6 is a flow chart of an example process 600 for activating, based on receiving a user command, one or more transaction restrictions of a transaction card and causing a transaction to be processed or declined based on whether transaction is compliant with the one or more transaction restrictions. In some implementations, one or more process blocks of FIG. 6 may be performed by a transaction card (e.g., transaction card 220). In some implementations, one or more process blocks of FIG. 6 may be performed by another device or a group of devices separate from or including the transaction card, such as a user device (e.g., user device 210), a transaction server (e.g., transaction server 230), and/or the like.

As shown in FIG. 6, process 600 may include receiving sound waves that represent a user command, wherein the user command identifies one or more transaction restrictions of the transaction card (block 610). For example, the transaction card (e.g., using processor 320, memory 330, storage component 340, input component 350, communication interface 370, and/or the like) may receive sound waves that represent a user command, as described above. In some implementations, the user command may identify one or more transaction restrictions of the transaction card.

As further shown in FIG. 6, process 600 may include converting the sound waves to a compressed digital signal (block 620). For example, the transaction card (e.g., using processor 320, memory 330, storage component 340, input component 350, output component 360, communication interface 370, and/or the like) may convert the sound waves to a compressed digital signal, as described above.

As further shown in FIG. 6, process 600 may include identifying, based on an analysis of the compressed digital signal, user command data that identifies the user command (block 630). For example, the transaction card (e.g., using processor 320, memory 330, storage component 340, and/or the like) may identify, based on an analysis of the compressed digital signal, user command data that identifies the user command, as described above.

As further shown in FIG. 6, process 600 may include setting, based on identifying the user command data, one or more transaction restriction values for the one or more transaction restrictions (block 640). For example, the transaction card (e.g., using processor 320, memory 330, storage component 340, and/or the like) may set, based on identifying the user command data, one or more transaction restriction values for the one or more transaction restrictions, as described above.

As further shown in FIG. 6, process 600 may include receiving metadata associated with a transaction (block 650). For example, the transaction card (e.g., using processor 320, memory 330, storage component 340, input component 350, communication interface 370, and/or the like) may receive transaction metadata associated with a transaction, as described above.

As further shown in FIG. 6, process 600 may include determining whether the transaction is compliant with the one or more transaction restrictions (block 660). For example, the transaction card (e.g., using processor 320, memory 330, storage component 340, and/or the like) may determine whether the transaction is compliant with the one or more transaction restrictions, as described above.

As further shown in FIG. 6, process 600 may include causing, based on determining whether the transaction is compliant with the one or more transaction restrictions, the transaction to be; processed by a server device, or declined by the transaction card without assistance from the server device (block 670). For example, the transaction card (e.g., using processor 320, memory 330, storage component 340, communication interface 370, and/or the like) may cause. based on determining whether the transaction is compliant with the one or more transaction restrictions, the transaction to be processed by a server device (e.g., transaction server 230), or to be declined by the transaction card without assistance from the server device, as described above.

Process 600 may include additional implementations, such as any single implementation or any combination of implementations described below and/or in connection with one or more other processes described elsewhere herein.

In some implementations, the transaction card may receive, before receiving the sound waves, data identifying a degree to which the transaction card is in motion, may determine that the degree to which the transaction card is in motion satisfies a threshold amount of motion, and may power on a sound sensor of the transaction card based on determining that the degree to which the transaction card is in motion satisfies the threshold amount of motion.

In some implementations, the one or more transaction restrictions may include a first transaction restriction that limits an amount that is permitted to be charged for transactions, a second transaction restriction that limits transactions to transactions involving a particular product, a third transaction restriction that limits transactions to transactions involving a particular merchant, and/or a fourth transaction restriction that provides a time frame during which one or more other transaction restrictions are valid.

In some implementations, when identifying the user command data, the transaction card may reference a data structure that associates the user command data and a corresponding compressed digital signal that satisfies a threshold level of similarity with the compressed digital signal. In some implementations, the transaction card may permit a communication session to be established between the transaction card and a user device. In some implementations, the transaction card may receive, from the user device and via the communication session, a transaction restriction value for a transaction restriction of the one or more transaction restrictions. In some implementations, the transaction card may store, via a secure memory of the transaction card, the transaction restriction value in association with a transaction restriction identifier for the transaction restriction.

In some implementations, when determining whether the transaction is compliant, the transaction card may compare the one or more transaction restriction values and the transaction metadata and may determine whether the transaction is compliant with the one or more transaction restrictions based on comparing the one or more transaction restriction values and the transaction metadata.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a sound sensor physically present on a transaction card, sound waves that represent a user command,
        wherein the sound sensor is powered on based on a device of the transaction card detecting that the transaction card has been moved in a particular pattern, and
        wherein the user command identifies one or more transaction restrictions of the transaction card;
    converting, by one or more processors of the transaction card, the sound waves to a digital signal;
    identifying, by the one or more processors of the transaction card and based on an analysis of the digital signal, user command data that identifies the user command;
    setting, by the one or more processors of the transaction card and based on identifying the user command data, one or more transaction restriction values for the one or more transaction restrictions;
    receiving, by the one or more processors of the transaction card, transaction metadata associated with a transaction;
    determining, by the one or more processors of the transaction card, whether the transaction is compliant with the one or more transaction restrictions by comparing the one or more transaction restriction values and values of the transaction metadata; and
    causing, by the one or more processors of the transaction card and based on determining whether the transaction is compliant with the one or more transaction restrictions, the transaction to be:
    processed by a server device, or
    declined.

2. The method of claim 1, wherein causing the transaction to be processed by the server device or declined comprises:
    causing the transaction to be declined based on determining that the transaction does not comply with the one or more transaction restrictions,
        wherein the transaction card declines the transaction without assistance from the server device.

3. The method of claim 1, further comprising:
    detecting, before receiving the sound waves, that the transaction card has been moved in the particular pattern; and
    powering on the sound sensor based on detecting that the transaction card has been moved in the particular pattern.

4. The method of claim 1, further comprising:
    converting the digital signal to a compressed digital signal,
        wherein the compressed digital signal is represented by a set of byte arrays; and wherein identifying the user command data that identifies the user command comprises:
            identifying the user command data by referencing a data structure that associates a command identifier for the user command and a corresponding set of byte arrays that satisfy a threshold level of similarity with the set of byte arrays that represent the compressed digital signal.

5. The method of claim 1, further comprising:
    converting the digital signal to a compressed digital signal; and
    wherein identifying the user command data that identifies the user command comprises:
        providing the compressed digital signal to another device to cause the other device to perform one or more actions to identify the user command data, and
        receiving the user command data from the other device.

6. The method of claim 1, wherein the one or more transaction restrictions include at least one of:
    a first transaction restriction that limits an amount that is permitted to be charged for transactions,
    a second transaction restriction that limits transactions to transactions involving a particular product,
    a third transaction restriction that limits transactions to transactions involving a particular merchant, or
    a fourth transaction restriction that provides a time frame during which one or more other transaction restrictions are valid.

7. The method of claim 1, wherein determining whether the transaction is compliant comprises:
    comparing the one or more transaction restriction values and the transaction metadata, wherein the transaction metadata includes at least one of:
timestamp data,
data identifying a transaction amount,
a product identifier, or
a merchant identifier, and
determining whether the transaction is compliant with the one or more transaction restrictions based on comparing the one or more transaction restriction values and the transaction metadata.

8. A transaction card, comprising:
a secure memory;
a set of sensors; and
one or more processors configured to:
receive, from a motion sensor of the set of sensors physically present on the transaction card, an indication that the transaction card has been moved in a particular pattern;
power on, based on receiving the indication that the transaction card has been moved in the particular pattern, a sound sensor of the set of sensors;
receive, from the sound sensor, sound waves that represent a user command that has been detected by the sound sensor,
wherein the user command identifies one or more transaction restrictions of the transaction card;
convert the sound waves to a digital signal;
identify, based on an analysis of the digital signal, user command data that identifies the user command;
set, based on identifying the user command data, one or more transaction restriction values for the one or more transaction restrictions in the secure memory;
receive transaction metadata associated with a transaction;
determine whether the transaction is compliant with the one or more transaction restrictions by comparing the one or more transaction restriction values and values of the transaction metadata; and
cause, based on determining whether the transaction is compliant with the one or more transaction restrictions, the transaction to be authorized or declined.

9. The transaction card of claim 8, wherein the one or more processors, when causing the transaction to be authorized or declined, are configured to:
cause, based on determining that the transaction is not compliant with the one or more transaction restrictions, the transaction to be declined without assistance from an external device.

10. The transaction card of claim 8, wherein the one or more processors are further configured to:
convert the digital signal to a compressed digital signal; and
determine whether the user command is made by an authorized user by analyzing the compressed digital signal; and
wherein the one or more processors, when identifying the user command data, are configured to:
identify the user command data based on determining that the user command is made by the authorized user.

11. The transaction card of claim 8, wherein the one or more transaction restrictions include at least one of:
a first transaction restriction that limits an amount that is permitted to be charged for transactions,
a second transaction restriction that limits transactions to transactions involving a particular product,
a third transaction restriction that limits transactions to transactions involving a particular merchant, or
a fourth transaction restriction that provides a time frame during which one or more other transaction restrictions are valid.

12. The transaction card of claim 8, wherein the one or more processors are further configured to:
convert the digital signal to a compressed digital signal; and
wherein the one or more processors, when identifying the user command data that identifies the user command, are configured to:
identify the user command data by referencing a data structure that associates the user command data and a corresponding compressed digital signal that satisfies a threshold level of similarity with the compressed digital signal.

13. The transaction card of claim 8, wherein the one or more processors are further configured to:
convert the digital signal to a compressed digital signal; and
wherein the one or more processors, when identifying the user command data, are to:
compare the compressed digital signal and a set of compressed digital signals that are associated with a set of command identifiers,
fail to identify the user command data based on comparing the compressed digital signal and the set of compressed digital signals,
provide the compressed digital signal to a device to cause the device to perform one or more actions to identify the user command data, and
receive the user command data from the device.

14. The transaction card of claim 8, wherein the one or more processors are further configured to:
determine, after setting the one or more transaction restriction values, that a time period has expired; and
reset the one or more transaction restriction values based on determining that the time period has expired.

15. A non-transitory computer-readable medium storing instructions, the instructions comprising:
one or more instructions that, when executed by one or more processors of a transaction card, cause the one or more processors to:
receive sound waves, obtained using a sound sensor physically present on the transaction card, that represent a user command,
wherein the sound sensor is powered on based on a device of the transaction card detecting that the transaction card has been moved in a particular pattern, and
wherein the user command identifies one or more transaction restrictions of the transaction card;
convert the sound waves to a compressed digital signal;
identify, based on an analysis of the compressed digital signal, user command data that identifies the user command;
set, based on identifying the user command data, one or more transaction restriction values for the one or more transaction restrictions;
receive transaction metadata associated with a transaction;
determine whether the transaction is compliant with the one or more transaction restrictions by comparing the one or more transaction restriction values and values of the transaction metadata; and cause, based on determining whether the transaction is compliant with the one or more transaction restrictions, the transaction to be:
processed by a server device, or
declined by the transaction card without assistance from the server device.

16. The non-transitory computer-readable medium of claim 15, wherein the one or more instructions, when executed by the one or more processors, further cause the one or more processors to:
receive, before receiving the sound waves, data identifying a degree to which the transaction card is in motion;
determine that the degree to which the transaction card is in motion satisfies a threshold amount of motion; and
power on the sound sensor of the transaction card based on determining that the degree to which the transaction card is in motion satisfies the threshold amount of motion.

17. The non-transitory computer-readable medium of claim 15, wherein the one or more transaction restrictions include at least one of:
a first transaction restriction that limits an amount that is permitted to be charged for transactions,
a second transaction restriction that limits transactions to transactions involving a particular product,
a third transaction restriction that limits transactions to transactions involving a particular merchant, or
a fourth transaction restriction that provides a time frame during which one or more other transaction restrictions are valid.

18. The non-transitory computer-readable medium of claim 15, wherein the one or more instructions, that cause the one or more processors to identify the user command data, cause the one or more processors to:
reference a data structure that associates the user command data and a corresponding compressed digital signal that satisfies a threshold level of similarity with the compressed digital signal.

19. The non-transitory computer-readable medium of claim 15, wherein the one or more instructions, when executed by the one or more processors, further cause the one or more processors to:
permit a communication session to be established between the transaction card and a user device;
receive, from the user device and via the communication session, a transaction restriction value for a transaction restriction of the one or more transaction restrictions; and
store, via a secure memory of the transaction card, the transaction restriction value in association with a transaction restriction identifier for the transaction restriction.

20. The non-transitory computer-readable medium of claim 15, wherein the one or more instructions, that cause the one or more processors to determine whether the transaction is compliant, cause the one or more processors to:
compare the one or more transaction restriction values and the transaction metadata, and
determine whether the transaction is compliant with the one or more transaction restrictions based on comparing the one or more transaction restriction values and the transaction metadata.

* * * * *